(12) United States Patent
Omachi et al.

(10) Patent No.: US 12,344,743 B2
(45) Date of Patent: Jul. 1, 2025

(54) CURING COMPOSITION

(71) Applicant: Sunstar Engineering Inc., Osaka (JP)

(72) Inventors: Takuro Omachi, Osaka (JP); Tomohiro Yamaguchi, Osaka (JP)

(73) Assignee: Sunstar Engineering Inc., Osaka (JP)

( * ) Notice: Subject to any disclaimer, the term of this patent is extended or adjusted under 35 U.S.C. 154(b) by 899 days.

(21) Appl. No.: 17/426,091

(22) PCT Filed: Feb. 5, 2020

(86) PCT No.: PCT/JP2020/004413
§ 371 (c)(1),
(2) Date: Jul. 27, 2021

(87) PCT Pub. No.: WO2020/162507
PCT Pub. Date: Aug. 13, 2020

(65) Prior Publication Data
US 2022/0089871 A1    Mar. 24, 2022

(30) Foreign Application Priority Data
Feb. 6, 2019    (JP) .................................. 2019-019984

(51) Int. Cl.
*C08L 75/08*    (2006.01)
*C08L 83/06*    (2006.01)

(52) U.S. Cl.
CPC ............... *C08L 75/08* (2013.01); *C08L 83/06* (2013.01); *C08L 2205/03* (2013.01)

(58) Field of Classification Search
CPC .. C08G 18/4018; C08G 18/4236–4241; C08G 18/44; C08G 18/4825–4858; C08G 18/10; C08G 18/3253; C08G 18/3228; C08G 77/46; C08L 75/06; C08L 75/08; C09D 175/04; C09D 175/06; C09J 175/04; C09J 175/06
See application file for complete search history.

(56) References Cited

U.S. PATENT DOCUMENTS

| | | | | |
|---|---|---|---|---|
| 3,770,481 A * | 11/1973 | Canat | ....................... | D06N 3/14 428/315.7 |
| 3,959,049 A * | 5/1976 | Tanaka | ................. | D06N 3/0043 521/64 |
| 8,349,988 B2 * | 1/2013 | Song | ...................... | C09J 175/04 528/49 |
| 10,882,943 B2 | 1/2021 | Smits et al. | | |
| 2005/0054764 A1 | 3/2005 | Zhou et al. | | |
| 2006/0079589 A1 * | 4/2006 | Tadokoro | ........... | C08G 18/4018 521/155 |
| 2007/0265427 A1 | 11/2007 | Takai et al. | | |
| 2009/0149622 A1 * | 6/2009 | Sonnenschein | ........ | C08G 18/10 528/65 |
| 2012/0279654 A1 | 11/2012 | Jialanella et al. | | |
| 2012/0295104 A1 | 11/2012 | Barker | | |
| 2018/0305597 A1 | 10/2018 | Yao | | |
| 2018/0355092 A1 | 12/2018 | Smits et al. | | |

FOREIGN PATENT DOCUMENTS

| | | |
|---|---|---|
| CN | 105255435 A | 1/2016 |
| CN | 107142068 A | 9/2017 |
| CN | 108148537 A | 6/2018 |
| EP | 0972864 A1 | 1/2000 |
| JP | 8295868 A | 11/1996 |
| JP | 09078028 A | 3/1997 |
| JP | 2002053635 A | 2/2002 |
| JP | 2004322339 A * | 11/2004 |
| JP | 2006291060 A | 10/2006 |
| JP | 2007503512 A | 2/2007 |
| JP | 2007332241 A | 12/2007 |
| JP | 2014511931 A | 5/2014 |
| JP | 2016525614 A | 8/2016 |
| JP | 2018522076 A | 8/2018 |
| WO | 99039030 A | 8/1999 |
| WO | 2006064736 A1 | 6/2006 |
| WO | 2009090947 A1 | 7/2009 |
| WO | 2015013407 A1 | 1/2015 |

OTHER PUBLICATIONS

FIT Translation of CN_108148537_A_I (Year: 2024).*
Google_Translation_of_JP_2004322339_A (Year: 2024).*
International Search Report for corresponding International Application No. PCT/JP2020/004413 mailed Apr. 21, 2020 and its English translation.
Extended European Search Report for corresponding European Application No. 20753181.5 issued Sep. 22, 2022.
Notice of Opposition for corresponding Japanese Patent No. 7138581 dated May 19, 2023.
International Preliminary Report on Patentability for corresponding International Application No. PCT/JP2020/004413 dated Aug. 10, 2021, English translation.
Office Action for corresponding Japanese Application No. 2019-019984 dated Apr. 19, 2022 and its English Machine Translation.
First Office Action for corresponding Chinese application No. 202080012178.1 issued Nov. 18, 2022 and its English Translation.

* cited by examiner

*Primary Examiner* — Michael M Dollinger
(74) *Attorney, Agent, or Firm* — Renner, Otto, Boisselle & Sklar, LLP

(57) ABSTRACT

Excellent adhesiveness to resin substrates is provided even with a reduced pretreatment, preferably without a pretreatment, by a curable composition comprising an urethane prepolymer (A) having a polyoxyalkylene backbone and an isocyanate group, and an urethane prepolymer (B) having a polycarbonate and/or polyester backbone and an isocyanate group.

12 Claims, No Drawings

CURING COMPOSITION

This application is a national phase of International Application No. PCT/JP2020/004413 filed 5 Feb. 2020, which claims priority to Japan Application No. 2019-019984 filed 6 Feb. 2019, the entireties of which are hereby incorporated by reference.

TECHNICAL FIELD

The present invention relates to a curable composition that can be used as an adhesive for automobile parts, etc., and in particular, a curable composition that can be used as an adhesive for resin base materials.

BACKGROUND ART

In recent years, resin materials have been applied to more and more automobile parts due to their advantages such as light weight and high degree of freedom in shape. As a result, to ensure the safety and strength of automobile, adhesives used for bonding to plastic structural materials are required to have improved adhesiveness.

In Patent Document 1 discloses that an adhesive composition combining a tetrafunctional OH compound and polycarbonate glycol with a urethane prepolymer consisting of PPG (polypropylene glycol) and MDI (diphenylmethane diisocyanate) can be used to improve adhesiveness to resin substrates.

PRIOR ART DOCUMENT

Patent Document

[Patent Document 1] JP H8-295868A

SUMMARY OF THE INVENTION

Problems to be Solved by the Invention

Normally, when adhesive is adhere to a resin substrate, it is necessary to improve the adhesiveness (e.g., adhesive strength, water resistance, heat resistance, moisture resistance, weather resistance, light resistance, etc.) by subjecting the substrate to pretreatment such as plasma treatment or corona treatment. However, such pretreatment process not only requires expensive equipment but also leads to prolonged work, which may increase cost and decrease productivity. Therefore, it would be industrially advantageous if the pretreatment process could be reduced (decrease in pretreatment time, decrease in materials required for pretreatment) or made unnecessary. The object of the present invention is to provide a curable composition having excellent adhesiveness to a resin substrate even if the pretreatment process is reduced, preferably without the pretreatment process.

Means to Solve the Problem

An embodiment of the invention is as follows:
Item 1
A curable composition comprising an urethane prepolymer (A) having a polyoxyalkylene backbone and an isocyanate group, and an urethane prepolymer (B) having a polycarbonate and/or polyester backbone and an isocyanate group.
Item 2
The curable composition according to item 1, wherein the number average molecular weight of the urethane prepolymer (A) is 1000 or more.
Item 3
The curable composition according to item 1 or 2, wherein the number average molecular weight of the urethane prepolymer (B) is 4000 or less.
Item 4
The curable composition according to any one of items 1 to 3, wherein the ratio of the number average molecular weight of the urethane prepolymer (B) to the number average molecular weight of the urethane prepolymer (A) ((Mn of the urethane prepolymer (B))/(Mn of the urethane prepolymer (A))×100%) is less than 100%.
Item 5
The curable composition according to any one of items 1 to 4, wherein the urethane prepolymer (A) comprises a reaction product of polyoxyalkylene polyol with a polyisocyanate (a), and
wherein the urethane prepolymer (B) comprises a reaction product of a polycarbonate polyol and/or a polyester polyol with a polyisocyanate (b).
Item 6
The curable composition according to item 5, wherein the polycarbonate polyol and/or the polyester polyol is aliphatic.
Item 7
The curable composition according to item 5 or 6, wherein the polyisocyanate (a) and/or the polyisocyanate (b) is aliphatic.
Item 8
The curable composition according to any one of items 1 to 7, comprising a silicone additive (C).
Item 9
The curable composition according to item 8, wherein the silicone additive (C) is a polyether-modified silicone.
Item 10
The curable composition according to item 9, wherein the polyether-modified silicone is an $(AB)_n$-type polyether-modified silicone.
Item 11
The curable composition according to any one of items 8 to 10, wherein a kinematic viscosity of the additive (C) is 3000 $mm^2/s$ or more.
Item 12
The curable composition according to any one of items 1 to 11, comprising a latent curing agent.
Item 13
The curable composition according to any one of items 1 to 12, for application to at least one resin substrate selected from the group consisting of polycarbonate resin, ABS resin, and mixtures thereof.

Effect of the Invention

Adhesives that utilize the curable composition of the present invention can exhibit excellent adhesiveness in bonding between resin substrates even with a reduced pretreatment (such as plasma treatment or corona treatment) of the resin substrates or preferably without a pretreatment of the resin substrates.

DETAILED DESCRIPTION OF EMBODIMENTS

The curable composition in the present invention comprises an urethane prepolymer (A) having a polyoxyalkylene backbone and an isocyanate group, and an urethane prepolymer (B) having a polycarbonate and/or polyester backbone and an isocyanate group.

In general, urethane prepolymers are obtained by reacting polyol with excess polyisocyanate, and have isocyanate groups at the molecular ends. The isocyanate groups in the urethane prepolymer react with hydroxyl groups or amino groups to form polyurethane (including polyurea). In other words, the urethane prepolymer functions as a prepolymer for polyurethane.

[Urethane Prepolymer (A)]

The urethane prepolymer (A) is an isocyanate group-containing polymer having a polyoxyalkylene backbone.

A polyoxyalkylene backbone may be the backbone represented by the general formula (1):

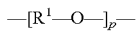

(In the formula, $R^1$ is an alkylene group, and p is an integer.)

$R^1$ may be a linear, branched-chain, or cyclic alkylene group, preferably a linear or branched-chain alkylene group. The number of carbons in $R^1$ may be 1 to 10, preferably 2 to 5. Examples of $R^1$ include ethylene group, propylene group, trimethylene group, n-butylene group (tetramethylene group), i-butylene group, s-butylene group, t-butylene group, etc., particularly ethylene group, propylene group, and tetramethylene group are preferable. In the polyoxyalkylene backbone, $R^1$ may be the same or different.

p may be 3 or more, for example, 5 or more, preferably 10 or more.

The backbone of the urethane prepolymer (A) preferably have no backbone other than the polyoxyalkylene backbone, and may consist substantially only of the polyoxyalkylene backbone.

From the viewpoint of physical properties (e.g., flexibility and elongation of the cured material), the number average molecular weight (Mn) of the urethane prepolymer (A) may be 1000 or more, for example, 1500 or more, especially 2500 or more, and preferably 4000 or more. From the viewpoint of further improving the handling properties by lowering the viscosity of the urethane prepolymer (A), Mn may be 30000 or less, and preferably 15000 or less. From the viewpoint of a good combination of physical properties and handling properties, Mn may be 500 to 25000, preferably 1000 to 20000, and more preferably 2500 to 10000. Mn is a polystyrene equivalent value measured by gel permeation chromatography (GPC).

The urethane prepolymer (A) may comprise a reaction product of the raw polymer of the urethane prepolymer (A) and the polyisocyanate (a). The raw polymer of the urethane prepolymer (A) may be a linear or branched-chain (e.g., 3 end branched chain) polyoxyalkylene polyol.

The raw polymer for the urethane prepolymer (A) may be a polyoxyalkylene polyol that can be obtained by addition polymerization of alkylene oxides such as ethylene oxide, propylene oxide, butylene oxide to ethylene glycol, propylene glycol, glycerin, trimethylolpropane, triethanolamine, pentaerythritol, ethylenediamine, aromatic diamine, sorbitol, sucrose, etc.

The number of hydroxyl groups possessed by the raw polymer of the urethane prepolymer (A) may be 2 to 8, preferably 2 to 4, and especially 2 or 3.

The polyisocyanate (a) may be an aliphatic polyisocyanate or an aromatic polyisocyanate. From the viewpoint of durability of adhesion (e.g., water resistance, heat resistance, moisture resistance), aliphatic polyisocyanates are preferred, and alicyclic polyisocyanates are particularly preferred. Alicyclic polyisocyanates may be monocyclic alicyclic polyisocyanates or polycyclic alicyclic polyisocyanates (e.g., bicyclic alicyclic polyisocyanates, tricyclic alicyclic polyisocyanates, bridged-ring alicyclic polyisocyanates, etc.).

Examples of aromatic polyisocyanates include tolylene diisocyanate (2,4- or 2,6-tolylene diisocyanate or a mixture) (TDI), phenylene diisocyanate (m-, p-phenylene diisocyanate or mixtures thereof), 4,4'-diphenyl diisocyanate, diphenylmethane diisocyanate (4,4'-, 2,4' or 2,2'-diphenylmethane diisocyanate or mixtures thereof) (MDI), 4,4'-toluidine isocyanate (TODI), 4,4'-diphenyl ether diisocyanate, xylene diisocyanate (1,3- or 1,4-xylylene diisocyanate or mixtures thereof) (XDI), tetramethylxylylene diisocyanate (1,3- or 1,4-tetramethylxylylene diisocyanate or mixtures thereof) (TMXDI), ω,ω'-diisocyanate-1,4-diethylbenzene, naphthalene diisocyanate (1,5-, 1,4-, or 1,8-naphthalene diisocyanate or mixtures thereof) (NDI), triphenylmethane triisocyanate, tris(isocyanate phenyl)thiophosphate, polymethylene polyphenylene polyisocyanate, nitrodiphenyl-4,4'-diisocyanate, 3,3'-dimethyldiphenylmethane-4,4'-diisocyanate, 4,4'-diphenylpropane diisocyanate, and 3,3'-dimethoxydiphenyl-4,4'-diisocyanate, and their multimers (dimer, trimer, pentamer, heptamer, uretidinedione, ureiton modified, polycarbodiimide, etc.), biuret modified, and other derivatives.

Specific examples of aliphatic polyisocyanates include acyclic aliphatic polyisocyanates such as trimethylene diisocyanate, 1,2-propylene diisocyanate, butylene diisocyanate (tetramethylene diisocyanate, 1,2-butylene diisocyanate, 2,3-butylene diisocyanate, 1,3-butylene diisocyanate), hexamethylene diisocyanate, pentamethylene diisocyanate, 2,2,4-trimethylhexamethylene diisocyanate, 2,4,4-trimethylhexamethylene diisocyanate, 2,6-diisocyanate-methylcapuate, lysine diisocyanate, lysine ester triisocyanate, 1,6,11-undecan triisocyanate, 1,3,6-hexamethylene triisocyanate, trimethylhexamethylene diisocyanate, decamethylene diisocyanate, etc.; monocyclic alicyclic polyisocyanates such as 1,3-cyclopentane diisocyanate, 1,3-cyclopentene diisocyanate, cyclohexane diisocyanate (1,4-cyclohexane diisocyanate, 1,3-cyclohexane diisocyanate), 3-isocyanate-methyl-3,5,5-trimethylcyclohexyl isocyanate (isophorone diisocyanate, IPDI), methylenebis (cyclohexyl isocyanate (4,4'-, 2,4'- or 2,2'-methylenebis (cyclohexyl isocyanate or mixtures thereof) (hydrogenated MDI), methylcyclohexane diisocyanate (methyl-2,4-cyclohexane diisocyanate, methyl-2,6-cyclohexane diisocyanate, bis(isocynate methyl)cyclohexane (1,3- or 1,4-bis(isocyanatemethyl)cyclohexane or mixtures thereof) (hydrogenated XDI), dimeric acid diisocyanate, trans cyclohexane 1,4-diisocyanate, hydrogenated tolylene diisocyanate (hydrogenated TDI), hydrogenated tetramethyl xylene diisocyanate (hydrogenated TMXDI), etc.; and bridged-ring alicyclic polyisocyanates such as norbornane diisocyanate, methyl norbornane diisocyanate, bicycloheptane triisocyanate, diisocyanate-methyl bicycloheptane, di(diisocyanate-methyl)tricyclodecane, etc.;

and their multimers (dimer, trimer, pentamer, heptamer, urethidinedione, ureitonimine, isosynurate modified, polycarbodiimide, etc.), biuret modified, and other derivatives.

The number of the isocyanate group in the polyisocyanate (a) may be 2 to 8, preferably 2 to 4, especially 2 (diisocyanate).

The molecular weight (e.g., number average molecular weight) of the polyisocyanate (a) may be 50 to 2000, for example 100 to 1500, preferably 150 to 1000. The carbon number of the polyisocyanate (a) may be 4 to 30, for example 5 to 12.

The polyoxyalkylene polyol is reacted with polyisocyanate (a) so that the molar ratio (NCO/OH) of the hydroxyl group (—OH) of the polyoxyalkylene polyol to the isocyanate group (—NCO) of the polyisocyanate (a) is preferably 1.5 to 4, and more preferably 1.8 to 3.2. The urethane prepolymer (A) can be produced by reacting polyoxyalkylene polyol with polyisocyanate (a) in said molar ratio, for example, by heating and stirring at 50 to 130° C. During the reaction, an urethanation catalyst such as an organotin compound, organobismuth or an amine may be used.

The —NCO group content of the urethane prepolymer (A) is preferably 0.5 to 10% by mass, more preferably 1 to 7% by mass, and even more preferably 1.5 to 5% by mass. The —NCO group content can be measured by the method described in the Examples.

In the curable composition, the content of the urethane prepolymer (A) may be 10 to 80% by weight, for example 20 to 60% by weight, and 30 to 50% by weight is preferred, relative to the total weight of the curable composition.

[Urethane Prepolymer (B)]

Urethane prepolymer (B) is an isocyanate-containing polymer having a polycarbonate and/or polyester backbone.

The polycarbonate backbone may be a backbone represented by the general formula (2)

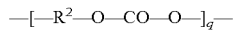

[In the formula, $R^2$ is a divalent hydrocarbon group, and q is an integer.]

$R^2$ may be aromatic or aliphatic and is preferably a linear, branched-chain or cyclic alkylene group, more preferably a linear alkylene group. The number of carbons in $R^2$ may be 1 to 15, for example 2 to 10, preferably 3 to 7. Specific examples of $R^2$ include a trimethylene group, a propylene group, a tetramethylene group, a pentamethylene group, a hexamethylene group, and a heptamethylene group. In the polycarbonate backbone, $R^2$ may be the same or different.

q may be 3 or more, for example, 5 or more, preferably 10 or more.

The backbone may be a backbone represented by the general formula (3):

$$-[-C(=O)-R^3-O-]_r-.$$

[In the formula, $R^3$ is a divalent hydrocarbon group, and r is an integer.]

$R^3$ may be a linear, branched-chain, or cyclic alkylene group, and is preferably a linear alkylene group. The number of carbons in $R^3$ may be 1 to 15, for example, 2 to 10, preferably 2 to 7. Specific examples of $R^3$ include a methylene group, an ethylene group, a trimethylene group, a propylene group, a tetramethylene group, a pentamethylene group, a hexamethylene group, a heptamethylene group, and the like. In the polycarbonate backbone, $R^3$ may be the same or different.

r may be 3 or more, for example 5 or more, preferably 10 or more.

Alternatively, the polyester backbone may be a backbone represented by the general formula (4):

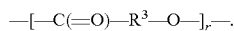

[In the formula, $R^{31}$ and $R^{32}$ each independently is divalent hydrocarbon, and s is an integer.]

For example, $R^{31}$ may be a divalent aromatic group (e.g., a phenylene group (p-phenylene group)) having 6 to 10 carbons or an alkylene group having 1 to 15 carbons (e.g., an alkylene group having 2 to 10 carbons), preferably an alkylene group having 2 to 7 carbons. $R^{32}$ may be an alkylene group having 1 to 15 carbons, for example, an alkylene group having 2 to 10 carbons, preferably an alkylene group having 2 to 8 carbons.

s may be 3 or more, for example, 5 or more, preferably 10 or more.

The polyester backbone may be at least one of the backbone represented by general formula (3) and the backbone represented by general formula (4), but it is preferable that the polyester backbone comprises the backbone represented by general formula (3) because it tends to have excellent adhesiveness. It is not clear why, among the same ester bonds, a prepolymer (B) having a polyester backbone represented by Formula (3), which is obtained, for example, by ring-opening polymerization of a lactone, tends to have better adhesiveness to the base material than a polyester backbone represented by Formula (4), which is obtained, for example, by polycondensation of a polycarboxylic acid and a polyol. However, the ester groups in the polyester backbone represented by formula (3) are oriented in the same direction, while the ester bonds next to each other in the polyester backbone represented by formula (4) are symmetrical. Therefore, it is presumed that the orientation of the ester bonds in the polyester backbone of the urethane prepolymer (B) affects the adhesiveness to the substrate, but the present invention is not limited to such presumption.

From the viewpoint of adhesiveness, the number average molecular weight (Mn) of the urethane prepolymer (B) may be 300 or more, for example 750 or more, preferably 1000 or more. From the viewpoint of compatibility (e.g., compatibility of the urethane prepolymer (B) in the curable composition), Mn may be 4000 or less, for example 3000 or less, and preferably 2500 or less. From the viewpoint of a good combination of physical properties and compatibility, Mn may be 300 to 4000, for example 750 to 4000, preferably 1000 to 3000. Here, Mn is a polystyrene equivalent value measured by gel permeation chromatography (GPC).

The ratio of the number average molecular weight of the urethane prepolymer (B) to the number average molecular weight of the urethane prepolymer (A) ((Mn of urethane prepolymer (B))/(Mn of urethane prepolymer (A))×100%) may be less than 100%, for example less than 75%, and preferably less than 50%. The ratio of Mn of the urethane prepolymer (B) to Mn of the urethane prepolymer (A) may be 1% or more, for example 3% or more, and preferably 5% or more (e.g. 8% or more). The ratio of the Mn of the urethane prepolymer (B) to the Mn of the urethane prepolymer (A) may be 1% to 100%, for example 3 to 85%, preferably 5 to 55% or less. It is presumed that by selecting the Mn of the urethane prepolymer (A) and the Mn of the urethane prepolymer (B) to be within the above range, the urethane prepolymer (A) and the urethane prepolymer (B) will be more appropriately compatible with each other, resulting in an adhesive interface with excellent adhesiveness. However, the present invention is not limited to this presumption in any way.

Urethane prepolymer (B) may comprise or be a reaction product of a raw polymer of the urethane prepolymer (B) with the polyisocyanate (b). The raw polymer of the urethane prepolymer (B) is a polycarbonate polyol or a polyester polyol. The raw polymer of the urethane prepolymer (B) has, for example, isocyanate groups on both ends.

Among the raw polymers for urethane prepolymer (B), polycarbonate polyol is a polyol having a polycarbonate backbone. Polycarbonate polyol can be aromatic or aliphatic and is preferably aliphatic. Polycarbonate polyols can be obtained, for example, by reacting phosgene with a polyol (diol). The polyol can be aromatic or aliphatic, for example an aliphatic polyol (aliphatic diol), preferably an alkanediol.

Among the raw polymers for urethane prepolymer (B), polyester polyol is a polyol having a polyester backbone. Polyester polyols may be aromatic or aliphatic, and are preferably aliphatic. Polyester polyol may be obtained, for example, by reacting a polyvalent carboxylic acid (dicarboxylic acid) with a polyalcohol (diol), or by ring-opening polymerization of a lactone.

The raw polymer of the urethane prepolymer (B) (i.e., polycarbonate polyol or polyester polyol) may be a polycarbonate polyester polyol, having both a polycarbonate backbone and a polyester backbone. Polycarbonate polyester polyols can be aromatic or aliphatic and are preferably aliphatic. Polycarbonate polyester polyols can be obtained, for example, by reacting a polycarbonate polyol with a lactone and then lactone-modifying (polymerizing with the lactone) the polycarbonate polyol.

The number of hydroxyl groups possessed by the raw polymer of urethane prepolymer (B) may be 2 to 8, preferably 2 to 4, and especially 2.

The polyisocyanate (b) may be the same as the polyisocyanate (a) described above. The polyisocyanate (a) and polyisocyanate (b) may be the same or different.

The raw polymer of the urethane prepolymer (B) and the polyisocyanate (b) are reacted so that the molar ratio of the hydroxyl group (—OH) of the raw polymer of the urethane prepolymer (B) to the isocyanate group (—NCO) of the polyisocyanate (b) (NCO/OH) is preferably 1.5 to 4, and more preferably 1.8 to 3.2. The urethane prepolymer (B) can be produced by reacting the raw polymer of the urethane prepolymer (B) with the polyisocyanate (b) at said molar ratio, for example, by heating and stirring at 50 to 130° C. During the reaction, an urethanation catalyst such as, for example, an organotin compound, organobismuth, or an amine may be used.

The —NCO group content of the urethane prepolymer (B) is preferably 0.5 to 10% by mass, more preferably 1 to 7% by mass, and even more preferably 1.5 to 5% by mass. The —NCO group content can be measured by the method described in the Examples.

In the curable composition, the content of the urethane prepolymer (B) may be 0.1 to 10% by weight, for example 0.3 to 7.5% by weight, with 1 to 5% being preferred, relative to the total weight of the curable composition.

The urethane prepolymer (A) and the urethane prepolymer (B) may be produced simultaneously. For example, by reacting a mixture of the raw polymer of the urethane prepolymer (A) and the raw polymer of the urethane prepolymer (B) with polyisocyanate (a) and/or polyisocyanate (b)), both of the urethane prepolymer (A) and the urethane prepolymer (B) can be produced simultaneously. In this case, the molar ratio of the sum of the hydroxyl groups in the raw polymers of urethane prepolymer (A) and urethane prepolymer (B) to the sum of the isocyanate group (—NCO) in the polyisocyanate (a) and the polyisocyanate (b) (NCO/OH) is preferably 1.5 to 4, and more preferably 1.8 to 3.2. Herein, the polyisocyanate (a) and polyisocyanate (b) may be the same or different.

[Silicone Additive (C)]

From the viewpoint of compatibility, the curable composition in the present invention preferably comprises a silicone additive (C). A silicone additive is an additive composed of polyorganosiloxane, which may be used as a foaming agent. The silicone additive (C) may be a polyorganosiloxane (e.g. polydimethylsiloxane) or a modified silicone in which a specific structure has been introduced into the end, side chain or main chain of the polyorganosiloxane. The presence of the silicone additive (C) can improve the compatibility of the urethane prepolymer (A) and the urethane prepolymer (B). It can improve workability by facilitating the preparation of the curable composition. Furthermore, the inventor has found that by improving the compatibility of the urethane prepolymer (A) and the urethane prepolymer (B), the adhesiveness of the curable composition to the substrate can be improved. In particular, when the molecular weight of the urethane prepolymer (A) is high (e.g., when the number average molecular weight of the urethane prepolymer (A) is 2500 or more, and especially when it is 4000 or more), the compatibility between the urethane prepolymer (A) and the urethane prepolymer (B) decreases, so the addition of a silicone additive is effective.

The modified silicone is preferably a polyether-modified silicone. The polyether-modified silicone is a copolymer that has a polyorganosiloxane group and a polyoxyalkylene group. The copolymer is preferably a block copolymer of dimethylpolysiloxane and polyether. The structure of the copolymer is not particularly limited, for example, an ABA type where polyoxyalkylene groups A are bonded to both ends of polysiloxane groups B; an $(AB)_n$ type where a plurality of polysiloxane groups B and a plurality of polyoxyalkylene groups A are bonded alternately; a branched type where polyoxyalkylene groups are bonded to each end of a branched polysiloxane group; and a pendant type where polyoxyalkylene groups are attached to the side chains (other than the ends) of the polysiloxane. Among these, the $(AB)_n$ type is preferred from the viewpoint of dispersibility and compatibility.

In polyether-modified silicones, the polyorganosiloxane group can be polydialkylsiloxane, for example polydimethylsiloxane.

In polyether-modified silicones, the polyoxyalkylene group can be polyoxyethylene, polyoxypropylene, polyoxytetramethylene, polyoxyethylene-polyoxypropylene copolymer, etc.

The polyether-modified silicones may have an active-hydrogen-containing group or an active-hydrogen-reactive group as part of their structure (e.g., at the end). Examples of the active-hydrogen-containing group include a hydroxyl group, an amino group, a carboxyl group, and a hydrazide group. Examples of the active-hydrogen-reactive group include an isocyanate group and an epoxy group. The compound obtained by reacting the active-hydrogen-containing group in the polyether-modified silicone with the active-hydrogen-reactive group in the compound containing the active-hydrogen-reactive group, or by reacting the active hydrogen-reactive group in the polyether-modified silicone with the active hydrogen-containing group in the compound containing the active hydrogen may be used as a polyether-modified silicone. Examples of the compounds containing active-hydrogen-reactive groups include polyisocyanate compounds and polyepoxy compounds. Examples of the active hydrogen-containing compounds include polyamine compounds, polyol compounds.

The kinematic viscosity of the silicone additives at 25° C. can be adjusted by changing the polyorganosiloxane chain length, polyoxyalkylene chain length, and ethylene oxide/alkylene oxide ratio. The kinematic viscosity may be 1000 mm$^2$/s or higher, for example 3000 mm$^2$/s or higher, and preferably 5000 mm$^2$/s or higher. The kinematic viscosity may be 30000 mm$^2$/s or less, preferably 20000 mm$^2$/s or less. The kinematic viscosity may be 4000 to 25000-mm$^2$/s, for example, 6,000 mm$^2$/s to 18,000 mm$^2$/s. The kinematic viscosity can be measured by known methods.

The specific gravity of the silicone additive can be adjusted by changing the content of the structure of the polyorganosiloxane, the structure of polyether and other structures. The specific gravity may be 0.92 or higher, preferably 0.98 or higher. The specific gravity may be 1.1 or less, preferably 1.07 or less. The specific gravity may be 0.92 to 1.1, for example, 0.98 to 1.07. Specific gravity can be measured by the specific gravity cup method or other known methods.

In the curable composition, the amount of silicone additive (C) may be 0.01 to 5% by weight, for example 0.05 to 2.5% by weight, preferably 0.1 to 1.0% by weight, relative to the total weight of the curable composition.

[Latent Curing Agent]

The curable composition in the present invention may further comprise a latent curing agent. The latent curing agent is a curing agent that is activated by heat, such as an amine latent curing agent. As an amine latent curing agent, for example, a solid amine belonging to an aromatic or aliphatic group with a melting point of 50° C. or higher may be used. Examples thereof include aromatic amines such as 4,4'-diaminodiphenylmethane, 2,4'-diaminodiphenylmethane, 3,3'-diaminodiphenylmethane, 3,4'-diaminodiphenylmethane, 2,2'-diaminobiphenyl, 2,4'-diaminobiphenyl, 3,3'-diaminobiphenyl, 2,4-diaminophenol, 2,5-diaminophenol, o-phenylenediamine, m-phenylenediamine, 2,3-trilenediamine, 2,4-trilenediamine, 2,5-trilenediamine, 2,6-trilenediamine, 3,4-trilenediamine, etc.;

aliphatic amines such as 1,12-dodecanediamine, 1,10-decanediamine, 1,8-octanediamine, 1,14-tetradecanediamine, 1,16-hexadecanediamine, etc.;

dihydrazide compounds such as dipic acid dihydrazide, sebacic acid dihydrazide, isophthalic acid dihydrazide, 1,3-bis(hydrazinocarboethyl)-5-isopropylhydantoin, eicosanedioic acid dihydrazide, hydroquinone diglycolic acid dihydrazide, resorcinol diglycolic acid dihydrazide, 4,4'-ethylidenebisphenol diglycolic acid dihydrazide;

and dicyandiamide, which can be used alone or in combination of two or more.

A polyamine-based modified compound can also be used as potential curing agents. The polyamine modified compound can be, for example, a reaction product of an aliphatic polyamine (i), an amine or aromatic polyamine with a cyclic structure having at least one NH$_2$ or NH group (ii), and a diisocyanate compound (iii).

Specific examples of aliphatic polyamines (i) include polyamines and monoamines such as dimethylaminopropylamine, diethylaminopropylamine, dipropylaminopropylamine, dibutylaminopropylamine, dimethylaminoethylamine, diethylaminoethylamine, dipropylaminoethylamine, dibutylaminoethylamine, trimethylhexamethylenediamine, diaminopropane, etc.

Specific examples of aromatic polyamines (ii) include meta-xylenediamine, 1,3-bis(aminomethyl)cyclohexane, isophoronediamine, menthanediamine, and diaminocyclohexane, phenylenediamine, toluylenediamine, xylenediamine, diaminodiphenylmethane, diaminodiphenyl sulfone, piperazine, N-aminoethylpiperazine, benzylamine, cyclohexylamine, etc. Examples of diisocyanate compounds (iii) include isophorone diisocyanate, meta-xylenediisocyanate, 1,3-bis(isocyanate methyl)cyclohexane, 2,4-tolylene diisocyanate, 2,6-tolylene diisocyanate, 1,5-naphthylene diisocyanate, 1,4-phenylene diisocyanate, diphenylmethane-4,4'-diisocyanate, 2,2'-dimethyldiphenylmethane-4,4'-diisocyanate, hexamethylene diisocyanate, trimethylhexamethylene diisocyanate, etc. Herein, the ratio of each reaction component may be selected to be (i) 1 mol, (ii) 0.02 to 3 mol, and NH$_2$ and/or NH of (i) and (ii)/NCO of (iii)=1/1 to 1.2. The polyamine-modified compounds may be obtained by reaction at room temperature to 160° C. in solvents such as aromatic hydrocarbons, alcohols, and ketones.

The polyamine modified compound may be a reaction product of an aliphatic polyamine (i), an aromatic polyamine (ii), a diisocyanate compound (iii), and an epoxide compound (iv). Specific examples of epoxide compound (iv) are glycidyl ethers obtained by reacting polyvalent phenols such as bisphenol A, bisphenol F, bisphenol S, hexahydrobisphenol A, catechol, resorcinol, trihydroxybiphenyl, benzophenone, hydroquinone, tetramethylbisphenol A, etc. with epichlorohydrin;

polyglycidyl ethers obtained by reacting aliphatic polyhydric alcohols such as glycerin, nempentyl glycol, ethylene glycol, and polyethylene glycol with epichlorohydrin;

glycidyl ether esters obtained by reacting hydroxycarboxylic acids such as p-oxybenzoic acid and oxynaphthoic acid with epichlorohydrin;

polyglycidyl esters derived from polycarboxylic acids such as phthalic acid, isophthalic acid, tetrahydrophthalic acid, endomethylenetetrahydrophthalic acid, trimellitic acid, and polymerized fatty acids;

glycidylaminoglycidyl ether derived from aminophenol, aminoalkylphenol;

gycidylaminoglycidyl esters derived from aminobenzoic acid; glycidylamines derived from aniline, toluidine, tribromaniline, xylirenediamine, 4,4'-diaminodiphenylmethane;

epoxidized polyolefin, glycidylhydantoin, glycidylalkylhydantoin, triglycidylcyanurate, butylglycidyl ether, phenylglycidyl ether, alkylphenylglycidyl ether, benzoic acid glycidyl ester, monoepoxides such as styrene oxide, etc.

Herein, the ratio of each reaction component may be selected to be (i) 1 mole, (ii) 0.5 to 5 moles, [NH$_2$ and/or NH of (i) and (ii)]/[epoxy group of (iv)]=1/0.3 to 0.9, and [NH$_2$ and/or NH of (i) and (ii)]/[NCO of (iii)]=1/0.15 to 1.35. The polyamine-modified compounds may be obtained by reacting some or all of (ii) with (iv) at 60 to 120° C. in the above solvent, then adding (i) and the remaining (ii) and (iii), and reacting at room temperature to 160° C. in the above solvent.

In addition, the use of fine powder-coated amine, in which the surface of the solid amine is coated with fine powder, as the latent curing agent allows the curing composition to be cured at a relatively low temperature in a short time.

As the fine powders, inorganic and organic fine powders can be used. Examples of inorganic fine powders include titanium dioxide, calcium carbonate, clay, silica, zirconia, carbon, alumina, talc, and mica. Examples of organic fine particles include polyvinyl chloride, polyacrylic resin, polystyrene, polyethylene, and urea resin. These can be used alone or in combination of two or more.

[Other Additives]

The curable composition in the present invention can comprise other additives as components other than the above, such as fillers, plasticizers, curing catalysts, silane coupling agents, polyisocyanate compounds, etc., as necessary.

Examples of the fillers include heavy calcium carbonate, untreated surface calcium carbonate, surface-treated calcium carbonate (such as fatty acid-treated calcium carbonate), fumed silica, hydrophobic silica, precipitable silica, carbon black, talc, mica, clay, glass beads, balloons such as microballoons, silas balloons, glass balloons, silica balloons, plastic balloons, organic powder-coated plastic balloons, etc., plastic particles, inorganic fibers such as glass fibers, metal fibers, organic fibers such as polyethylene fibers, polypropylene fibers, etc., aluminum borate, etc. silicon carbide, silicon nitride, potassium titanate, graphite, needle crystalline calcium carbonate, magnesium borate, titanium diboride, chrysotile, needle crystalline fillers such as wollastonite, aluminum flakes, aluminum powder, iron powder, and the like. These can be used alone or in combination.

The content of the filler is preferably 10% by mass or more, more preferably 15% by mass or more, and even more preferably 20% by mass or more, relative to the total weight of the curable composition. The filler content is preferably 70% or less by mass, more preferably 60% or less by mass, even more preferably 50% or less by mass, and especially preferably 40% or less by mass. When the filler content is 10% by mass or more, it is advantageous in terms of physical properties and workability. When the filler content is 70% or less by mass, it is advantageous in terms of physical properties and foamability.

Example of plasticizers (viscosity reducers, viscosity regulators) include phthalate esters such as di(2-ethylhexyl) phthalate, butyl benzyl phthalate, dinonyl phthalate, diisononyl phthalate (DINP), diisodecyl phthalate, diundecyl phthalate, diheptyl phthalate and butyl phthalyl butyl glycolate;
- aliphatic dibasic acid esters such as dioctyl adipate, diisononyl adipate, didecyl adipate, and dioctyl sebacate;
- Polyglycol benzoates such as polyoxyethylene glycol dibenzoate and polyoxypropylene glycol dibenzoate;
- Trimellitic acid ester;
- Pyromellitic acid esters;
- Phosphate esters such as tributylphosphate and tricresylphosphate;
- Alkylsulfonic acid phenyl ester (mezamol);
- hydrocarbons alkylbenzene, alkyl-substituted diphenyls, alkyl-substituted terphenyls, partially hydrogenated alkyl terphenyls, aromatic process oils, pine oils, paraffinic, naphthenic, polybutenic and other;
- Epoxidized hexahydrophthalic acid diesters.
- Plasticizers may be used singly or in combinations of two or more, and may be used to the extent that they do not cause problems with flash point, viscosity, foamability, or curability.

The content of the plasticizer may be 0 to 50% by mass, for example 5 to 45% by mass, and preferably 10 to 40% by mass, relative to the total weight of the curable composition. When the content of the plasticizer is within the above range, it is advantageous in terms of good physical properties after curing and ease of application of the curable composition.

Examples of curing catalysts include organotin compounds such as tin octylate, tin naphthenate, tin stearate, dibutyl tin dioctoate, dibutyl tin dilaurate, dioctyl tin dibursate, dibutyl tin bistriethoxysilicate, dibutyl tin dioleylmalate, dibutyl tin diacetate, 1,1,3,3-tetrabutyl-1,3-dilauryloxycarbonyl-distanoxane, dibutyl tin oxybisethoxysilicate, dibutyl tin oxide, reaction product of dibutyl tin oxide with phthalic acid ester, reaction product of dibutyltin oxide reacted with maleic acid diester and dibutyltin diacetylacetonate. Other organometallic compounds include carboxylic acid (e.g., octylic acid) salts of bismuth, barium, calcium, indium, titanium, zirconium, calcium, zinc, iron, cobalt, and lead, such as bismuth octylate and calcium octylate. These may be used alone or in combination of two or more.

The content of the curing catalyst may be 0.01 mass % or more, for example, 0.1 mass % or more, relative to the total weight of the curable composition. The content of the curing catalyst may be 10 mass % or less, for example 5 mass % or less, relative to the total weight of the curable composition. The content of the curing catalyst may be adjusted according to the curing speed.

Example of silane coupling agents include a silicon compound having a functional group reactive with organic compounds (e.g., vinyl polymerizable groups, epoxy groups, amino groups, methacrylate groups, thiol groups, isocyanate groups, etc.) and a functional group that chemically bond with inorganic materials such as glass, metal, and silica stone (e.g., at least one of selected from the group consisting of alkoxy groups with 1 to 20 carbons, hydroxyl groups an acetoxy group of 1 to 20 carbons, a halogen atom, a hydrogen atom, an oxime group of 1 to 20 carbons, an enoxy group, an aminoxy group, and an amide group, etc.). These may be used alone or in combination of two or more.

The content of the silane coupling agent may be 0.01 mass % or more, for example 0.1 mass % or more, relative to the total weight of the curable composition. The content of the silane coupling agent may be 5% by mass or less, for example 3% by mass or less, relative to the total weight of the curable composition. By including the silane coupling agent in the above range, the adhesiveness tends to be good.

As polyisocyanate compounds, the polyisocyanate compounds in the above description of polyisocyanate (a) or polyisocyanate (b) may be used. These may be used singly or in combination of two or more. The polyisocyanate compounds referred to herein do not include prepolymer (A) and prepolymer (B).

The content of the polyisocyanate compound may be 0.01 mass % or more, for example 0.1 mass % or more, relative to the total weight of the curable composition. The content of the polyisocyanate compound may be 5% by mass or less, for example 3% by mass or less, relative to the total weight of the curable composition. By including the polyisocyanate compound in the above range, the adhesiveness tends to be good.

In addition, as necessary, other additives other than the above such as colorants (e.g., bengara, titanium dioxide, other colored pigments, dyes, etc.), organic solvents (e.g., acetone, methyl ethyl ketone, ligroin, ethyl acetate, tetrahydrofuran, n-hexane, heptane, etc.), adhesion enhancers (e.g., epoxy compounds), UV absorbers and light stabilizers (e.g., benzotriazoles, hindered amines, etc.), antioxidants (e.g., hindered phenols, etc.), shaking agents (e.g., colloidal silica, organobentonite, fatty acid amides, hydrogenated castor oil, etc.), solvents (e.g., alicyclic hydrocarbons, aromatic hydrocarbons, etc.), and silicone oils may be used in appropriate amounts. Examples of silicone oils include diorganopolysiloxanes such as dimethyl silicone fluid and methylphenyl silicone oils other than silicone additive (C); organohydrogen polysiloxanes such as methylhydrogen silicone oils; and silicone oils with various functional groups introduced into the side chains and/or ends.

[Use of Curable Composition]

The curable composition of the present invention can be produced by mixing or blending the individual components in a customary manner. The curable composition of the invention may be used as a two-component or three-component system, but is usually used as a one-component system.

The curable composition in the present invention may be moisture curable, thermosetting or ultraviolet (UV) curable. The curable composition may be cured at a temperature of 0° C. to 50° C. However, from the viewpoint of accelerating the curing speed, curing is preferably achieved by heating the composition to a temperature exceeding 50° C. The time for curing the curable composition may be selected as appropriate according to the film thickness etc., and may be, for example, 3 minutes to 24 hours. In particular, when the curing composition includes the latent curing agent described above, it is possible to cure the curing composition at a relatively low curing temperature, for example, 50 to 150° C., preferably 60 to 120° C., more preferably 70 to 100° C., in a short time, for example, 1 to 30 minutes, preferably 5 to 20 minutes.

The curable composition in the present invention is suitable for adhesion to resin substrates. Adhesion to resin substrates may be adhesion of resin substrates to each other, or adhesion of resins to substrates other than resins. The resin substrate to which the curable composition in the present invention is applied may be saturated or unsaturated, and may be aromatic or aliphatic. For example, olefin resins, acrylic resins, polyamide resins, polyimide resins, polycarbonate (PC) resins, polyester resins, polyether resins, styrene resins (e.g., polystyrene resins, ABS resins, AS (acrylonitrile-styrene) resins, ASA (acrylonitrile-styrene-acrylate) resins, etc.) and mixtures (e.g., alloy resins) of these resins. Among them, from the viewpoint of adhesiveness, it is preferably a resin selected from PC resin, ABS resin, and mixtures thereof, and more preferably ABS resin and PC/ABS alloy resin. The weight ratio of PC/ABS in PC/ABS alloy resin may be 10/90 to 90/10, for example 20/80 to 80/20, and preferably 30/70 to 70/30. An adhesive using the curable composition in the present invention can adhere well to an aromatic resin substrate even when urethane prepolymer (B) with an aliphatic backbone is used.

EXAMPLE

The following examples and comparative examples are provided to further explain the invention. Unless otherwise noted, parts and percentages are based on mass.
[Test Method]
(Adhesion to Resin Base Material)

In order to evaluate the adhesiveness with and without a plasma treatment, plasma-treated and untreated PC/ABS plates (Sumitomo Bakelite) of 2 mmt were prepared. PC/ABS plates were cut to a size of 100 mm×25 mm. Shear adhesion strength test samples were prepared by applying each adhesive to a thickness of 1 mmt between PC/ABS plates of the same size and curing them at 80° C. for 15 minutes. The shear bond strength test sample thus prepared was mounted on a tensile strength tester, and both ends of the test specimen were pulled in the opposite direction at a speed of 50 mm/min to check the fracture state. The evaluation criteria for adhesiveness are as follows:
A: Cohesive breakdown of the adhesive layer
B: Partial interface breakdown between PC/ABS and adhesive layer
C: Complete interface breakdown between PC/ABS and adhesive layer
(Kinematic Viscosity Measurement Method)

Kinematic viscosity was measured by an Uveraude viscometer in accordance with JISZ8803.
(Molecular Weight Measurement Method)

The number average molecular weight (Mn) was calculated as the polystyrene equivalent value by gel permeation chromatography (GPC) using THF as the solvent.
(NCO % Content)

NCO % content was measured by potentiometric titration method in accordance with JISK0113.

Polymer Synthesis Example

The raw materials shown in Table 1 were reacted at 80° C. for 3 hours under a nitrogen atmosphere with a planetary mixer to obtain NCO-terminated urethane prepolymers I-V. In Table 1, the NCO/OH ratio indicates the molar ratio of NCO groups in the prepolymer to OH groups, and the numerical value in the raw material column indicates the mass part.

TABLE 1

|  | Urethane prepolymer (A1) | Urethane prepolymer (A2) | Urethane prepolymer (B1) | Urethane prepolymer (B2) | Urethane prepolymer (B3) | Urethane prepolymer (A) + (B) |
|---|---|---|---|---|---|---|
| Polyoxyalkylene polyol 1 | 2000 | — | — | — | — | 2000 |
| Polyoxyalkylene polyol 2 | — | 2000 | — | — | — | — |
| Polycarbonate polyol | — | — | 2000 | — | — | — |
| Polyester polyol 1 | — | — | — | 2000 | — | — |
| Polyester polyol 2 | — | — | — | — | — | 164 |
| Polycarbonate/Polyester polyol | — | — | — | — | 2000 | — |
| Polyisocyanate | 261 | 445 | 441 | 441 | 441 | 400 |
| Plasticizer | — | — | 611 | 611 | 611 | 644 |
| Total | 2261 | 2445 | 3052 | 3052 | 3052 | 3208 |
| NCO/OH ratio | 2.0 | 2.0 | 2.0 | 2.0 | 2.0 | 2.0 |
| NCO content (%) | 2.18 | 3.45 | 2.72 | 2.72 | 2.72 | 2.36 |

The components in Table 1 are specifically as follows.
Polyoxyalkylene polyol 1: EXCENOL 5030 from Asahi Glass (average molecular weight Mn 5000, average number of functional groups f=3, OH value=33)
Polyoxyalkylene polyol 2: EXCENOL 2020 from Asahi Glass (average molecular weight Mn 2000, average number of functional groups f=2, OH value=56)
Polycarbonate polyol: UH-200 from Ube Industries (number average molecular weight Mn 2000, average number of functional groups f=2, OH value=56)
Polyester polyol 1: PLACCEL 220 made by Daicel (number average molecular weight Mn 2000, average number of functional groups f=2, OH value 56)
Polyester polyol 2: PLACCEL 205 made by Daicel (number average molecular weight Mn 530, average number of functional groups f=2, OH value 213)
Polycarbonate/polyester polyol: UHC50-200 from Ube Industries, Ltd. (average molecular weight Mn 2000, average number of functional groups f=2, OH value 56, copolymer of polycarbonate and polycaprolactone)

Polyisocyanate: Isophorone diisocyanate (IPDI)
Plasticizer: Diisononyl phthalate (DINP)

Examples 1 to 15 and Comparative Example 1

A curable composition (adhesive) was prepared by mixing the raw materials with the composition (by mass) shown in Table 2 with a planetary mixer. The adhesives obtained were used to evaluate their adhesiveness to resin substrates. The results are shown in Table 2. The numbers in the adhesiveness column in Table 2 refer to the shear bond strength (MPa).

Plasticizer: DINP from Shin Nippon Rika
Polyisocyanate compound: Desmodur N3200A (aliphatic polyisocyanate biuret modified) manufactured by Sumika Cobestrol Urethane
Silane coupling agent: KBM-1003 (vinyltrimethoxysilane) manufactured by Shin-Etsu Chemical

INDUSTRIAL APPLICABILITY

The curing composition in the present invention can be used, for example, as an adhesive, sealing material, coating material, gasket material, packing, cushioning material, heat

TABLE 2

| | (Reference values) | Examples | | | | | | | | | | | | | | | Comparative Examples 1 |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | |
| Urethane prepolymer (A1) | (39.2%) | 180 | | 180 | 180 | 180 | 180 | 180 | 180 | 190 | 160 | 180 | 180 | | 180 | 180 | 180 |
| Urethane prepolymer (A2) | | | 180 | | | | | | | | | | | | | | |
| Urethane prepolymer (B1) | (3.2%) | 15 | 15 | 7 | | 15 | | 7 | | | 35 | 7 | 15 | | 7 | 7 | |
| Urethane prepolymer (B2) | | | | 7 | 15 | | | 7 | 15 | 5 | | 7 | | | 7 | 7 | |
| Urethane prepolymer (B3) | | | | | | | 15 | | | | | | | | | | |
| Urethane prepolymer (A) + (B) | | | | | | | | | | | | | | 200 | | | |
| Silicone Additives (C1) | (0.3%) | | | | 1 | 1 | 1 | 1 | 1 | 1 | 1 | 0.3 | | 1 | 1 | 1 | |
| Silicone Additives (C2) | | | | | | | | | | | | | 1 | | | | |
| Filler 1 | (3.3%) | 15 | 15 | 15 | 15 | 15 | 15 | 15 | 15 | 15 | 15 | 15 | 15 | 15 | 15 | 15 | 15 |
| Filler 2 | (5.4%) | 25 | 25 | 25 | 25 | 25 | 25 | 25 | 25 | 25 | 25 | 25 | 25 | 25 | 25 | 25 | 25 |
| Filler 3 | (6.5%) | 30 | 30 | 30 | 30 | 30 | 30 | 30 | 30 | 30 | 30 | 30 | 30 | 30 | 30 | 30 | 30 |
| Filler 4 | (0.6%) | 3 | 3 | 3 | 3 | 3 | 3 | 3 | 3 | 3 | 3 | 3 | 3 | 3 | 3 | 3 | 3 |
| Latent curing agent | (3.3%) | 15 | 23 | 15 | 15 | 15 | 15 | 15 | 15 | 15 | 15 | 15 | 15 | 16 | 15 | 15 | 14 |
| Plasticizer | (29.7%) | 136 | 136 | 136 | 136 | 136 | 136 | 136 | 136 | 136 | 136 | 136 | 136 | 136 | 136 | 136 | 136 |
| Polyisocyanate compounds | (0.3%) | | | | | | | | | | | | | 1 | | | |
| Silane coupling agent | | | | | | | | | | | | | | | 2 | | |
| Total | (100%) | 419 | 427 | 418 | 419 | 420 | 421 | 420 | 420 | 421 | 421 | 419 | 420 | 427 | 421 | 422 | 418 |
| Adhesion to PC/ABS | With Plasma | 1.3A | 1.0A | 1.3A | 1.3A | 1.3A | 1.3A | 1.3A | 1.3A | 1.3A | 1.3A | 1.3A | 1.3A | 1.3A | 1.4A | 1.3A | 1.2A |
| | Without Plasma | 1.0B | 0.8B | 1.0B | 1.0B | 1.3A | 1.3A | 1.3A | 1.3A | 1.2A | 1.3A | 1.2A | 1.0B | 1.0B | 1.4A | 1.3A | 0.2C |

The ingredients in Table 2 are specifically as follows.
Silicone additive (C1): Toray Dow Corning SZ-1923 (polyether-modified silicone $(AB)_n$ type, kinematic viscosity 12,000 $mm^2$/s (25° C.))
Silicone additive (C2): Toray Dow Corning KF-352A (polyether-modified silicone, side chain modified, kinematic viscosity 1,600 $mm^2$/s (25° C.))
Filler 1: TS720 (hydrophobic silica) manufactured by Cabot Specialty Chemicals Inc.
Filler 2: CCR-B (surface-treated calcium carbonate) manufactured by Shiraishi Calcium
Filler 3: Whiten SB (heavy calcium carbonate) manufactured by Shiraishi Calcium
Filler 4: Mitsubishi #40 (carbon black) manufactured by Mitsubishi Chemical
Latent curing agent: Solid amine (1,12-dodecanediamine, melting point 71° C.) with a median particle diameter of 13 μm, of which surface is coated with a fine powder (titanium dioxide fine powder) having a central particle diameter of 0.02 μm.

insulating material, and foam molding material. The curing composition in the present invention can also be used as polyurethane foam in civil engineering and construction materials, packaging, electrical and electronic equipment, automobiles, household goods, sports and daily life products, etc., which require the functions of heat insulation, weight reduction, cushioning, cushioning, soundproofing, vibration control, shock absorption, protection, decorative surface skin, water sealing and airtightness.

The invention claimed is:
1. A curable composition comprising an urethane prepolymer (A) having a polyoxyalkylene backbone and an isocyanate group, an urethane prepolymer (B) having a polycarbonate and/or polyester backbone and an isocyanate group, and a silicone additive (C),
wherein the urethane prepolymer (A) comprises a reaction product of polyoxyalkylene polyol with a polyisocyanate (a), and wherein the urethane prepolymer (B) comprises a reaction product of a polycarbonate polyol and/or a polyester polyol with a polyisocyanate (b), wherein the polycarbonate polyol, the polyester polyol, the polyisocyanate (a) and the polyisocyanate (b) are aliphatic, wherein the content of the urethane prepolymer (A) is 30 to 50% by weight relative to the total weight of the curable composition, wherein the content of the urethane prepolymer (B) is 1 to 5% by weight relative to the total weight of the curable composition.

2. The curable composition according to claim 1, wherein the number average molecular weight of the urethane prepolymer (A) is 1000 or more.

3. The curable composition according to claim 1, wherein the number average molecular weight of the urethane prepolymer (B) is 4000 or less.

4. The curable composition according to claim 1, wherein the ratio of the number average molecular weight of the urethane prepolymer (B) to the number average molecular weight of the urethane prepolymer (A) ((Mn of the urethane prepolymer (B))/(Mn of the urethane prepolymer (A))× 100%) is less than 100%.

5. The curable composition according to claim 1, wherein the silicone additive (C) is a polyether-modified silicone.

6. The curable composition according to claim 5, wherein the polyether-modified silicone is an $(AB)_n$-type polyether-modified silicone.

7. The curable composition according to claim 1, wherein a kinematic viscosity of the additive (C) is 3000 $mm^2/s$ or more.

8. The curable composition according to claim 1, comprising a latent curing agent.

9. The curable composition according to claim 1, for application to at least one resin substrate selected from the group consisting of polycarbonate resin, ABS resin, and mixtures thereof.

10. The curable composition according to claim 1, comprising a filler and a plasticizer, wherein the content of the filler is 10 to 70% % by weight to the total weight of the curable composition, wherein the content of the plasticizer is 10 to 40% by weight to the total weight of the curable composition.

11. The curable composition according to claim 1, comprising at least one selected from a group consisting of a filler and a plasticizer.

12. The curable composition according to claim 1, comprising a latent curing agent, a filler and a plasticizer.

* * * * *